Dec. 4, 1956   J. R. FORD ET AL   2,773,256
SCANNER WAVE-GUIDE
Filed Nov. 30, 1950

INVENTORS
JOHN R. FORD &
RICHARD W. HOWERY
BY   J. L. Whittaker
ATTORNEY

United States Patent Office 2,773,256
Patented Dec. 4, 1956

2,773,256

SCANNER WAVE GUIDE

John R. Ford, Narberth, Pa., and Richard W. Howery, Haddonfield, N. J., assignors, by mesne assignments, to the United States of America as represented by the Secretary of the Air Force Application November 30, 1950, Serial No. 198,306

6 Claims. (Cl. 343—768)

The present invention relates to waveguides and more particularly to waveguides in which the phase velocity of the electromagnetic waves propagated longitudinally therein may be varied.

In radar (radio echo detection and ranging) apparatus it is customary to employ a scanning antenna. The scanning antenna usually provides a highly directive energy electromagnetic energy pattern, which may be angularly scanned through a sector of space. The present invention is related to scanners in which the scanning action is secured by the motion of a member which changes the phase velocity or wave velocity of energy passing through a waveguide. The waveguide is coupled to a plurality of antenna elements. As the phase velocity is changed, the radiated energy scans a sector of space. Of course, the energy pattern of the antenna also scans for received energy. The operation of these scanners and the correlation of the scanning action by suitable apparatus connecting the waveguide and the moving member to the remainder of the radar apparatus is well known and understood in the art.

In a certain type of electromagnetic energy scanner, sometimes known as an "eagle scanner," a section of rectangular waveguide through which the energy is propagated in the dominant mode has effectively a narrow side wall movable toward the other narrow side wall thereby changing the broad dimension of the guide. Such a scanner is described, for example in Section 9, starting at page 291 of Radar System Engineering, edited by Ridenour, volume 1, Radiation Laboratory Series, published by M. I. T. The broad dimension of a rectangular waveguide is determinative of the phase velocity or wave velocity of the energy propagated within the guide. The phase velocity may therefore be readily varied at will. A series of radiating (or antenna) elements are spaced along one wall of the waveguide to couple to energy therein. These elements are spaced with relation to the wave velocity of the energy of the guide to radiate in predetermined phase relationships, so that a predetermined radiation pattern results. As the wave velocity is varied, however, the phase relationships of the energy radiated by the antenna elements changes, and therefore the axis of the radiation pattern changes in angle so that a scanning action results. Difficulties are encountered with this type of scanner because as the phase velocity is varied the effective conductance of the antenna elements is also varied due to their interdependent relationship with the waveguide. As a result of the conductance variation, the radiation pattern tends to deteriorate at parts of the scanning cycle, and the device can be designed to have the desired pattern at only one position of the movable member.

As a particular example, an eagle scanner may employ as radiating or receiving elements a series of slots in the narrow wall of the waveguide which are inclined at an angle to the normal to the longitudinal axis of the narrow wall. For example, see the article by W. H. Watson, volume 93, part III-A, No. 4, of the Journal of the Institution of Electrical Engineers (1946) on "Resonant Slots." These slots have a conductance which is determined in part by their angle of inclination and in part by the waveguide wall dimensions. When the narrow wall of the waveguide is moved, this conductance changes appreciably if any practical scanning angle is to be achieved by the variation in wave velocity. As a result, the axis of the radiation pattern or lobe not only is shifted, but the lobe itself is altered in form, and the desired directive pattern may deteriorate badly. The latter effect of the alteration in the lobe form is generally undesirable and may be sufficient to make such scanners entirely impractical for the desired purpose.

Accordingly, it is an object of the present invention to improve scanning devices, and particularly those of the hollow pipe waveguide type.

Another object of the invention is to provide a novel variable phase velocity waveguide, and also a novel waveguide scanning apparatus.

It is a further object of the invention to provide an improved means for varying the wave velocity of waves propagated in a longitudinal hollow pipe waveguide.

A further object of the invention is to improved scanners of the type employing a plurality of antenna elements coupled along the waveguide wherein the scanning action is due to variation of the wave velocity of the guide.

Another object is to improve such scanners employing slot antenna elements.

In accordance with the invention a waveguide comprising a section of longitudinal pipe through which the electromagnetic energy is propagated is provided with a plunger in one side wall thereof. Preferably, the plunger is only a fractional portion of a side wall, the other side wall portion remaining fixed or comprising a further movable plunger. In a preferred form of the invention, the waveguide is otherwise rectangular except for the plunger which is located centrally in what would be the broad wall of an otherwise rectangular waveguide. This plunger is moved transversely thereby effectively providing a ridge waveguide having a ridge of variable height. In other embodiments, the plunger may be located entirely at one side of one of the wide walls of an otherwise rectangular guide. Again it may be off-centered but not entirely to one side. It is also possible to use a plurality of plungers if desired, either in the wide or narrow walls. By the use of the plunger, it is possible to minimize variations in the conductance of the radiating elements and to reduce these variations in conductance to an important degree.

The foregoing and other objects, advantages, and novel features of the invention will be more apparent from the following description when taken in connection with the accompanying drawing in which like reference numerals refer to like parts and in which.

Figure 1:
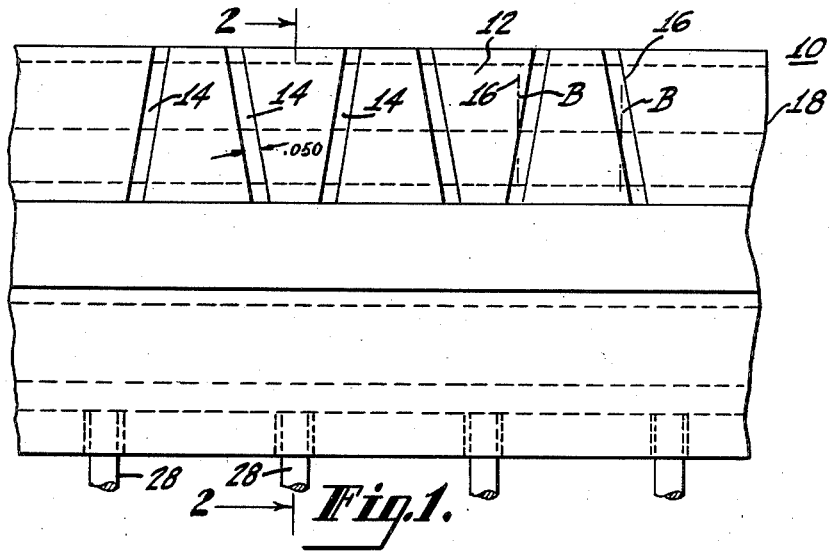
Fig. 1 is a face view of a portion of a scanner employing the invention.
Figures 2, 2A:
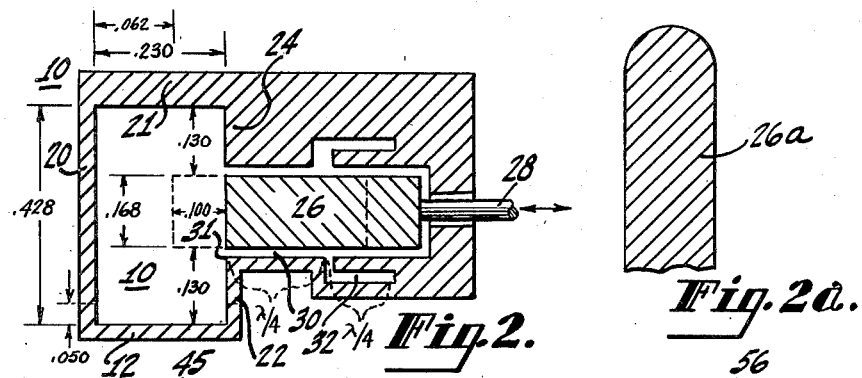
Fig. 2 is a transverse cross-sectional view of the embodiment of Fig. 1.
Fig. 2a is a transverse cross-sectional view of a portion of a plunger which may be employed as an alternative to the plunger illustrated in Fig. 2.

Referring now more particularly to Figs. 1 and 2, which illustrate a preferred embodiment of the invention, a section of waveguide 10 several wavelengths long at the operating frequency has cut in a narrow wall 12 a series of inclined slots 14. The slots 14 are inclined at an angle B with respect to lines 16 normal to the longitudinal axis 18 of the narrow wall 12. The angles B of inclination of the slots 14 are reversed with successive slots in order to reverse the phase of the energy coupled with the slots. The slots are separated by a predetermined and calculated distance to give a desired radiation pattern having due regard to the phase velocity in the waveguide 10 and its expected variations. The angle of inclination of the slots may individually be varied to couple the desired amount of power through each slot. The angles are normally varied because the energy is fed in from one end of the guide and, as an example, it may be assumed desirable to equalize the radiation of energy from each slot (although more generally the centrally located slots are designed to radiate more power than those at the ends). This equalization may be accomplished by suitably choosing different angles B of inclination. Equal angles of inclination would mean that those slots nearer the source would couple out greater amounts of power than those more remote. A broad wall 20 of the waveguide section 10 is planar and normal to the planar wall 12 and contiguous therewith. A narrow wall 21 is planar and parallel and opposite to the narrow wall 12 and normal and contiguous to broad wall 20. A fourth wall of the waveguide comprises sections 22 and 24 which are fixed and planar and normal to and respectively contiguous to the narrow walls 12 and 21 and parallel and opposite the broad wall 20. A plunger 26 extends the length of the waveguide section 10 and is worked by pistons 28 connected at intervals to the plunger 26. The arrangement is one in which one of the broad walls of an otherwise rectangular waveguide has a longitudinal opening, into which the longitudinal plunger is variably inserted to provide the equivalent of a ridge waveguide with a variable height ridge. The antenna elements are the resonant slots in one of what would otherwise be the narrow wall of the otherwise (except for the ridge) rectangular waveguide. The mechanism for driving a piston may be similar to that for moving one wall of a typical eagle scanner as shown, for example, in volume 1 of the Radiation Laboratory Series, entitled Radar System Engineering, edited by Ridenour, at page 294, Fig. 9.21. The wall portions 22 and 24 may be suitably thickened as necessary to provide choke joints. The choke joints are provided, for example, by the space 30 (between piston 26 and thickened wall portion 22) of an effective one quarter wavelength long at the operating frequency from the termination or corner 31 of the wall portion 22 remote from the slotted narrow wall 12 to the passageway 32 cut in the thickened part of the wall portion 22; and by the passageway 32 communicating with the space 30 one quarter wavelength long electrically at the operating frequency and short-circuited at the end remote from its point of communication with passageway 30.

In operation it is desired to maintain the effective conductance of the slots 14 as invariant as possible throughout the motion of the piston 26. The piston 26 is in effect a longitudinal plunger movable transversely in an otherwise rectangular waveguide. Effectively a ridge waveguide with a variable ridge height is provided by the embodiment illustrated in Fig. 2. The variation in phase velocity of such a guide may be computed either experimentally or from data already known; for example, reference may be had to an article by Seymour B. Cohn entitled "Properties of Ridge Waveguide," volume 35, Proceedings of the IRE, starting at page 783, August 1947.

In volume 12 of the Radiation Laboratory Series published by M. I. T., entitled Microwave Antenna Theory and Design, edited by Silver, starting at section 9, is developed a relationship between the slot conductance, free space wavelength $\lambda$, the waveguide wavelength, and the waveguide dimensions for inclined shunt slots, such as those shown in Fig. 1. Referring to formula 50 of section 9.11, the slot conductance in a rectangular waveguide varies in direct proportion to the waveguide wavelength (that is, to the wave velocity within the waveguide) and inversely proportional to the cube of the broad wall dimensions and inversely proportional to the first power of the narrow wall dimensions with an additional factor. However, for small angles of inclination of the slots (say, less than 10°) the additional factor may be shown to be negligible in effect (that is, substantially constant) for the present purposes. It is the fact that the conductance of a slot varies with inverse proportionality to the cube of the broad wall dimension that causes the difficulty in the conventional structure. However, with the improved device according to the invention it is possible to choose the dimension of the plunger with relation to its stroke and the variation of wave velocity so that this variation in conductance is at least considerably reduced. The dimensions shown in inches on Fig. 2 have been thus calculated for an operating free space wavelength of 1.875 centimeters or .738 inch. These dimensions have been developed by first assuming a fixed rectangular waveguide with a narrow wall dimension of .230 inch and a broad wall dimension of .428 inch. This corresponds to assuming the plunger 26 to be withdrawn to be flush with the adjoining wall portions 22 and 24 of Fig. 2, which point may be taken as one extreme of the plunger stroke. At the extreme inward extension of the plunger 26, there is an effective ridge waveguide with a ridge whose height is $\frac{1}{10}$ of an inch and the width of the ridge is .168 inch. The slot conductances at these two points are substantially equalized. Since there is no engineering data on the novel structure, a series of computations are necessary using the formula and data developed in the Cohn article and also the formula in volume 12 of the Radiation Laboratory Series. The ridge waveguide is treated as a rectangular waveguide having different effective broad wall dimensions with different depths of penetration of the ridge. The conductances of the slots can then be calculated at least to a first order approximation for the two extreme positions of the plunger. If these conductances are not equal, new calculations may be made based on different plunger dimensions, particularly the width dimension. The stroke of the plunger may be determined by mechanical considerations and the required phase velocity variation. If the new calculation does not tend to equalize the conductances of the slots with the plunger in its extreme positions, calculations are repeated going in the necessary direction for the width of the plunger to tend to equalize the slot conductances. In other words, the novel structure makes it possible, by affording different choices in the plunger width and stroke to give the necessary phase variation with an optimum performance. Such optimization of performance may also be secured by trial and error with models of different dimensions. Particularly with the resonant slots employed as antenna elements, the performance is optimized with relation to the effective conductance of the slots throughout the piston stroke. The choke joints are placed so that the effective short-circuit caused by them always appears at the corner between the plunger and the fixed walls of the waveguide. It will be understood that the driving rods 28 may be connected to a driving plate or if desired the plunger may be extended without the driving rods and connected to a suitable driving plate. The driving plate may be actuated by a drive giving a plunger penetration sinusoidal with time, similar to the drive of the known eagle scanners.

Referring now more particularly to Fig. 2a, there is illustrated a different type of plunger 26a, having a rounded head, which may be used as an alternative to the plunger 26 of Fig. 2. The rounded head of this plunger affords some advantage in preventing high electric field stresses at the corners and tending to avoid undesired ionization of air if the waveguide 10 is airfilled. Modified plunger shapes may also be used in other embodiments illustrated herein.

Figure 3:
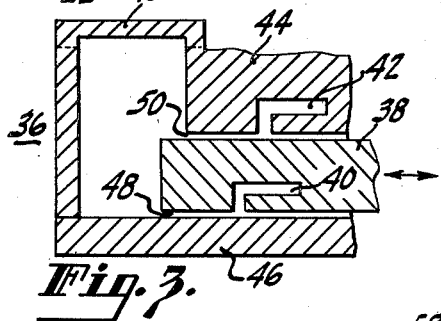
Fig. 3 is a transverse cross-sectional view of another embodiment of the invention in which a plunger is entirely at one side of a broad wall of an otherwise rectangular waveguide.

Referring now more particularly to Fig. 3, an otherwise rectangular waveguide section 36 several wavelengths long has inserted in one of the broad walls a plunger 38 which contains within it a choke slot 40. Another choke slot 42 is contained in the fixed portion 44 of one of the side wall portions next adjacent plunger 38. The plunger 38 is also immediately adjacent a neighboring side wall 46. It will be observed that the choke joint slot 40 communicates with a space 48 between the side wall 46 and the plunger 38 so that the effective short-circuit is always between the termination of the plunger within the waveguiding space and the side wall 46. On the other hand, the choke joint slot 42 is placed in the fixed wall portion 44 to communicate with the space 50 between plunger 38 and wall portion 44 so that the effective short-circuit is always at the termination of the wall portion next adjacent the plunger 38. The effective short-circuits are thus placed at the proper points whereby energy leakage through the spaces 48 and 50 is prevented. The same type of optimization with respect to effective conductance of the radiating elements which may be slots (not shown) in wall 45 contiguous to wall 44 similar to slots 14, of waveguide 36 may be secured as with the embodiment of Fig. 2. This is accomplished, of course, by suitable choice of the width of plunger 38 and its stroke. In the remaining embodiments, presence of the antenna elements is also assumed (but not illustrated) as slots, because these are preferred in that their conductance variation is readily minimized. However, other antenna elements may be employed, and the same difficulty with respect to these other elements, existing to a greater or lesser degree, is similarly avoided or ameliorated.

Figure 4:
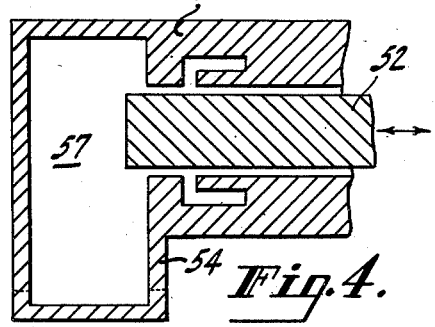
Fig. 4 is a transverse cross-sectional view of another embodiment of the invention in which the plunger is off-centered in the broad wall of an otherwise rectangular waveguide but not completely at one side thereof.

Referring now more particularly to Fig. 4, there is shown a plunger 52 which is off-centered between the wall portions 54 and 56 in a waveguide section 57 several wavelengths long. In this embodiment, it will be apparent that there is provided in effect a ridge waveguide having a ridge of variable penetration, the ridge being, however, off-centered in this case instead of centered as in Fig. 2. Again the same type of optimization with respect to the effective conductance of the antenna elements may be secured.

Figure 5:
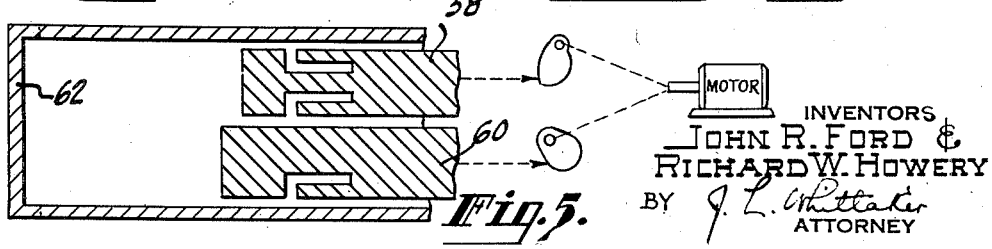
Fig. 5 is a transverse cross-sectional view of still another embodiment of the invention in which two plungers are employed.

In Fig. 5 there is shown a still further variation of the invention in which a pair of plungers 58 and 60 are employed and driven through a cam action to provide any desired variation of phase velocity with respect to motion during the cycle of rotation of the motor shaft through which the cams are connected. In this case the plungers are inserted in what would otherwise be the narrow wall of a rectangular waveguide. The choke joints in every instance are of course located to prevent the leakage of energy, it being understood that, with the slots here shown, plunger 58 is preferably not to advance into the waveguide beyond the head of plunger 60. Although there has been illustrated only one type of radiating elements herein, namely the slots 14 of Fig. 1, because the embodiment of Fig. 2 is peculiarly appropriate to operation with the slots, it will be understood that other suitable radiating elements may be employed. These may be probe-fed slots, dipoles, or various other radiating elements some of which are mentioned or described in some of the above-mentioned publications. However, in the embodiment of Fig. 5, the type of slot elements as illustrated in Fig. 1 are placed in narrow wall 62 opposite the plungers 58, 60 instead of in an adjacent narrow wall as in Figs. 2, 3, and 4.

One of the advantages secured by the invention is due to the fact, for example, referring to Fig. 2, that first the extremes in variation in phase velocity, and second, the conductance of the radiating slots are the two factors which are to be controlled. For this purpose, there are available two independent parameters, namely the width of the plunger and its stroke, where formerly only one independent parameter was available, namely the broad wall dimension of a rectangular waveguide. It will also be apparent that, referring more particularly to Fig. 2a, the contour of the head of the plunger may be chosen to affect the variation of phase velocity with stroke and thereby to assist advantageously in equalizing the conductance of the radiating elements at the extreme positions of the plunger. However, because of the complexity of the mathematical formulas required to analyze the structures of the invention, it is hardly possible to use a direct mathematical approach. It is more practical to employ customary engineering techniques of constructing models and by making measurements well understood in the art arriving at final design dimensions.

It should be noted that the waveguide scanner herein disclosed scans in one plane, and may be used with a lens or reflector such as a cylindrical lens or reflector which may improve focus in a second plane normal to the one plane, and by suitable scanning motion of or between the waveguide scanner and the lens or reflector, may also scan simultaneously in the second plane. Although the description herein has been directed to the radiation of energy from radiating elements connected to the waveguide, it is understood that the device is equally suitable for the reception of energy and with a like scanning action. In waveguide scanners it is customary to supply energy to the waveguide from a source located at one end thereof and received energy may be withdrawn if desired from the waveguide from the same channel through which a source of energy is connected by suitable transmit-receive switch arrangements well understood and known in the art. The mode of connection of the source of energy, the transmit-receive switch arrangements, scanning with a lens or reflector in a second plane and other details of employment of the novel waveguide scanner, have been omitted from the above description as not necessary to an understanding of the present invention.

In view of the foregoing, it will be apparent that we have disclosed a new and novel scanning apparatus which provides an improved scanning action by minimizing deterioration of a directive energy pattern from waveguide-fed arrays.

What is claimed:

1. An electromagnetic energy scanning apparatus comprising, a rectangular hollowpipe waveguide having a longitudinal axis and including a waveguide section a plurality of wavelengths long at the operating frequency, said waveguide section having three fixed walls and a fourth wall having a portion thereof adapted to receive a movable metallic plunger, a metallic plunger extending the length of said waveguide section transversely movable through said fourth wall in a direction normal to said axis toward and away from the wall opposite said fourth wall for varying the wave velocity of energy propagated in said waveguide section, said waveguide section having effective dimensions $a_1$ and $b_1$ and energy propagated therethrough having a guide wavelength of $\lambda_{g1}$ when said plunger is at one extreme of said transverse movement, said waveguide section having effective dimensions of $a_2$ and $b_2$ and energy propagated therethrough having a guide wavelength of $\lambda_{g^2}$ when said plunger is at the other extreme of said transverse movement, $$\frac{\lambda_{g^1}}{a_1{}^3 b_1}$$

for one extreme of plunger movement equalling $$\frac{\lambda_{g^2}}{a_2{}^3 b_2}$$

for the other extreme of plunger movement, and a plurality of antenna elements coupled to said waveguide section along the length thereof for establishing a directive energy pattern which scans in space with the motion of said plunger.

2. The apparatus claimed in claim 1, said plunger being centrally located in said one side wall.

3. Apparatus as claimed in claim 1, said plunger having a rounded head.

4. Apparatus as claimed in claim 1, said fourth wall having a portion thereof fixed, the entire remaining portion immediately adjacent a neighboring side wall being said plunger.

5. Apparatus as claimed in claim 1, said plunger being off-center in said fourth side wall.

6. Apparatus as claimed in claim 1, said waveguide section being rectangular in transverse cross-sectional configuration except for said fourth wall, said fourth wall being wider than the two walls adjacent thereto and planar and parallel to the wall opposite thereto except for said plunger.

References Cited in the file of this patent
UNITED STATES PATENTS

| | | |
|---|---|---|
| 2,468,751 | Hansen et al. | May 3, 1949 |
| 2,480,189 | Irving | Aug. 30, 1949 |
| 2,480,208 | Alverez | Aug. 30, 1949 |
| 2,527,817 | Hey | Oct. 31, 1950 |
| 2,567,748 | White | Sept. 11, 1951 |
| 2,602,893 | Ratliff | July 8, 1952 |
| 2,605,413 | Alvarez | July 29, 1952 |